United States Patent [19]

Conta et al.

[11] Patent Number: 4,595,938

[45] Date of Patent: Jun. 17, 1986

[54] INK JET PRINT HEAD

[75] Inventors: Renatol Conta, Ivrea; Enrico Manini, Camandona, both of Italy

[73] Assignee: Ing. C. Olivetti & C., S.p.A., Ivrea, Italy

[21] Appl. No.: 617,813

[22] Filed: Jun. 6, 1984

[30] Foreign Application Priority Data

Jun. 10, 1983 [IT] Italy .............................. 67641 A/83

[51] Int. Cl.[4] .............................................. G01D 15/18

[52] U.S. Cl. .............................................. 346/140 R

[58] Field of Search ...................... 346/140 R, 140 PD

[56] References Cited

U.S. PATENT DOCUMENTS 4,275,290 6/1981 Cielo et al. .............. 346/140 PD X
4,308,547 12/1981 Lovelady et al. ............ 346/140 PD
4,458,256 7/1984 Shirato et al. ............... 346/140 PD

*Primary Examiner*—George H. Miller, Jr.
*Attorney, Agent, or Firm*—Banner, Birch, McKie & Beckett

[57] ABSTRACT

The head is provided for a conductive ink (16) and comprises a container (14) having a capillary nozzle (18) where the ink is in contact with a pair of electrodes facing each other across the nozzle, in such a way as to be covered by a predetermined depth of ink between the electrodes and the meniscus (52) at the front end of the nozzle. Printing is effected by vaporization of a portion of ink in a section of the nozzle between the electrodes, which expels the said depth of ink. The container is closed by an insulating plate (30) over which extends a metal strip (37) of smaller width than the diameter of the nozzle. The nozzle is formed by means of a single hole through the plate and the strip, whereby the strip is separated into two electrodes. The metal strip may be disposed between the plate and a front dielectric layer 43. The latter may also be covered by a second insulating layer having a front part of the nozzle therethrough, while the first dielectric layer may have a hole which is larger in diameter than the nozzle so as to create a reserve of ink for the frequent dots. For a multi-nozzle head, the nozzles are produced through an insulating plate over which extend the strips for a plurality of pairs of electrodes.

17 Claims, 9 Drawing Figures

INK JET PRINT HEAD

BACKGROUND OF THE INVENTION

The present invention relates to an ink jet print head comprising a container for conductive ink, provided with a capillary nozzle, a pair of electrodes disposed in the nozzle and facing each other across the nozzle, the ink forming a meniscus in the nozzle at a position such as to create a predetermined depth of ink between the electrodes and the meniscus, and wherein at least part of this depth of ink is expelled by selectively energizing the electrodes with voltage pulses such as to cause vaporization of a portion of ink by the effect of the current through the ink in the section of the nozzle between the electrodes.

Heads have been proposed for printing by means of a jet of ink from a nozzle, produced by the instantaneous vaporization of a portion of ink in the nozzle in such a way as to expel the layer of ink thereon. In one known head the ink is conductive and submerges a pair of electrodes which are disposed in facing relationship in a common plane perpendicular to the nozzle, whereby vaporization is caused by passing current through the ink, between the two electrodes. Such a head suffers from the disadvantage of generally requiring a relatively large nozzle diameter and, to avoid ink leakage, has the nozzle directed upwardly so that it is not possible to produce immediately readable printing.

SUMMARY OF THE INVENTION

The object of the present invention is to provide an ink jet head which is simple and economical and which permits printing of uniform dots within certain limits in regard to variations in the distance of the nozzle from the print carrier. The print head according to the invention is characterized in that the container is closed by an insulating place on which there is disposed a metal strip of a thickness of less than 50μ and of a width which is less than the diameter of the nozzle, the nozzle comprising a hole passing through the plate and the metal strip which thus forms the two electrodes.

BRIEF DESCRIPTION OF THE DRAWINGS

The invention will be described in more detail, by way of example, with reference to the accompanying drawings, in which.

DESCRIPTION OF THE PREFERRED EMBODIMENTS

Figure 1:
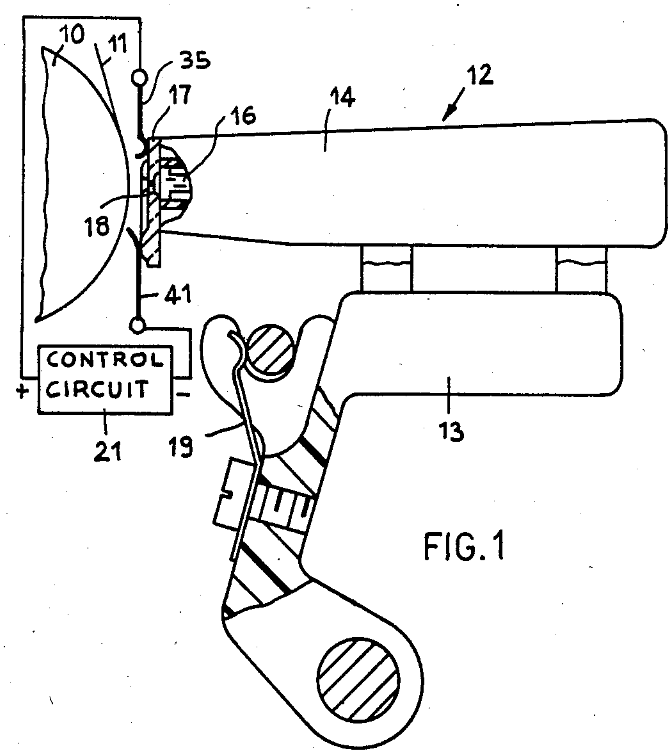
FIG. 1 shows a sectional view of part of a print head.

Referring to FIG. 1, a platen roller 10 supports a sheet of paper 11 which is displaced vertically to permit dots to be printed in successive elementary lines, for example for dot-matrix alphabetic printing.

The printer comprises an ink jet print head 12, substantially of the tupe described in our published British patent application GB No. 2 087 314, so that it will be only briefly described herein.

The head 12 is mounted on a carriage 13 which is movable transversely with an alternating movement and essentially comprises a container 14 of insulating material for the ink 16 which is electrically conductive. The container 14 is closed towards the platen roller by a plate 17 in which there is provided a nozzle 18 for expelling the droplets of ink. The carriage 13 is urged towards the roller 10 by a spring 19. The printer comprises an electrical control circuit 21 which is operable to produce a voltage pulse between two electrodes in contact with the ink 16, as explained below.

In accordance with a first embodiment of the invention, the plate 17 (see FIG. 2) comprises a base portion 30 of alumina or ceramic containing 96% to 99% of $Al_2O_3$, which has a portion 31 of a thickness of between 0.2 and 0.6 mm. The base portion 30 has a portion 32 which projects downwardly with respect to the container 14.

A strip 37 is also formed by a thickness film process so as to extend over the surface of the metal base 30 which faces outwardly, the strip 37 being of a layer of conductive noble metal, for example platinum, which is less than 50μ in thickness. Preferably, the thickness of the layer 37 is between 10 and 15μ so that it can be produced by a single application operation. The width of the strip 37 (see FIG. 3) is less than the diameter of the nozzle 8 by at least 20%.

The portion 32 of the base portion 30 which is also covered by the strip 37 has a boss 38 projecting towards the paper 11 and covered by a layer 39 of wear-resistant conducting material, for example chromium, or thick film resistance means of the type used for the production of potentiometers with a low resistivity value. Preferably, the resistivity is selected at a value which is not higher than 100 ohm/square, while the thickness of the layer 39 is between 10 and 15μ.

The boss 38 normally bears, under the force of the spring 19, against a transverse paper-pressure bar 41 of electrically conductive material which is electrically connected to one pole of the circuit 21. The thickness of the bar 41 is such that, together with the boss 38, during the printing operation, it holds the nozzle 18 at a preset distance from the paper 11 of between 0.3 and 0.5 mm.

The base 30 and the strip 37, with the exception of the part covering the projecting portion 38, are covered by a dielectric layer 43, for example of glass-ceramic material, of a thickness at least twice that of the metal strip 37, in dependence on the volume or depth of ink in which the two electrodes are to be submerged. Preferably, that thickness is between 5 and 100μ and can be produced by two or more application operations by means of a screen printing process, which are alternated with firing. The dielectric layer 43 is then covered by an anti-adhesion layer 44, for example of glass, to prevent the particles of ink from adhering to the outside surface of the plate 17. The layer of glass 4 may be not more than 20μ in thickness, being preferably about 10μ.

The nozzle 18 is produced by drilling the layers 31, 37, 43 and 44 of the plate 17 in a single operation, by means of a laser beam, in such a way as to produce a minimum section of the nozzle of a diameter of between 30 and 60μ. The nozzle then flares slightly in the direction in which the laser beam acts. The nozzle 18 may be produced with an outward flare as in FIG. 2, if dots of a diameter of 0.2–0.3 mm are to be produced in the printing operation, as is required in high-speed, low-definition printers. Alternatively, the nozzle 18 may be produced with an inward flare, thereby producing dots of smaller diameter and at a distance from the paper towards the upper limit specified hereinbefore.

In any case, the hole of the nozzle 18 separates the strip 37 into two parts whereby the two ends 40 and 42 which face each other across the nozzle 18 constitute the two electrodes of the head 12. The end 40 of the lower portion of the strip 37 is connected, as already noted, to one pole of the circuit 21 by means of the bar 41. The end 42 of the upper portion of the strip 37 comprises a region 35 which is not covered by the layers 43 and 44 and is connected by means of a blade spring 46 to the other pole of the circuit 21.

Figures 2, 3:
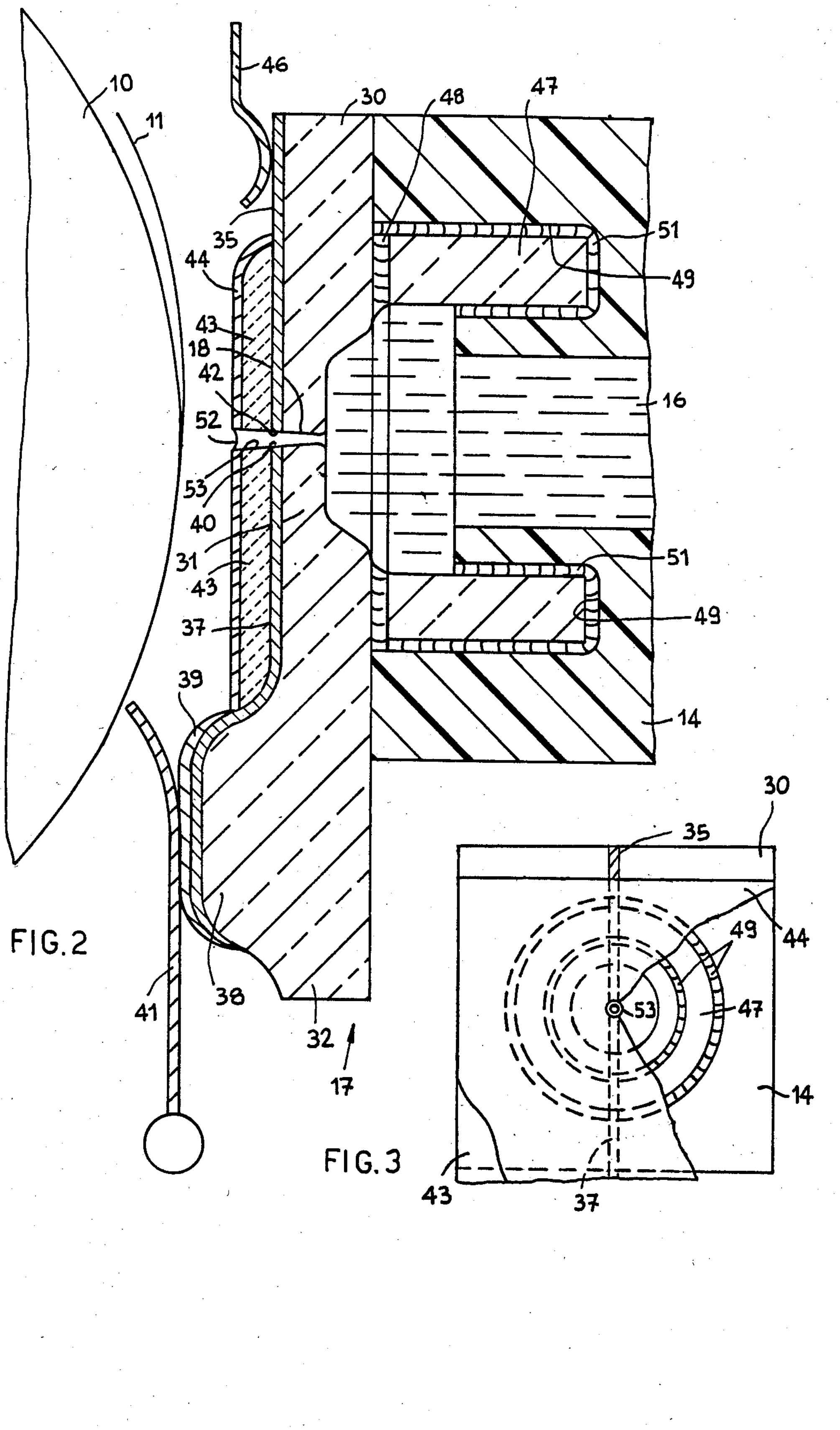
FIG. 2 is a diagrammatic view on an enlarged scale of a detail of a first embodiment of a print head.
FIG. 3 is a front view of a part of the detail shown in FIG. 1, on a reduced scale.

When the plate 17 has been thus prepared and drilled, a ceramic collar 47 is bonded to the plate 17, substantially concentrically with respect to the nozzle 18, by means of a layer of glass 48. The plate 17 is thus ready to be bonded to the container 14. For that purpose, the container 14 is provided with a seat 49 comprising a circular groove into which the sleeve 47 is bonded with polymeric resin 51 to close the container 14 filled with ink 16. The head 12 can now be mounted on the carriage 13 of the printing apparatus. Normally, by a capillary action, the ink 16 fills the nozzle 18 and forms a meniscus 52 in line with the outside surface of the plate 17, that is to say, the layer 44, as shown in FIG. 2, whereby the electrodes 40 and 42 are submerged under a predetermined depth or volume of ink. The hole in the layer 43 thus forms a front duct 53 (front part of the nozzle), which contains the said volume of ink.

By energization of the control circuit 21, a variable voltage pulse is passed between the two electrodes 41 and 42, causing a flow of current in the ink 16 which is between those electrodes, but without substantially influencing either the major part of the ink in the container 14 or the volume of ink disposed in the duct 43. The flow of current in the ink 16 causes a rise in temperature which produces a vaporization effect, forming a bubble which rapidly expands. The bubble on the one hand expels towards the paper substantially the whole volume of ink in the front duct 53 between it and the meniscus 52, thus printing the dot. On the other hand, the bubble tends to displace part of the ink from the nozzle 18 which is disposed between the bubble and the container 14, towards the container.

The duration of the voltage pulse is calibrated in such a way as to minimize the dimension of the bubble, to permit rapid restoration of the meniscus 42 on the outside edge of the front duct 53. Voltage pulses of between 1000 and 3000 V of a duration of between 40 and 60 μs produce dots which are very clear and sharp up to a distance of 5 mm, and a meniscus restoration time such as to permit dots to be printed at a frequency of up to 10 kHz.

In accordance with an alternative form of the invention, a platinum strip 90 (see FIG. 4) similar to the strip 37 in FIG. 2 is applied to the internal surface of the portion 31 of the base portion 30 while applied to the outside surface thereof is a layer of glass 91 to prevent the ink from adhering thereto. Also applied to the platinum strip 90 is a strip of glass 92 (see FIG. 5) which is interrupted in a limited area 93 corresponding to the position of the nozzle 18, for the purposes of protecting the metal layer 37 from corrosion. The nozzle 18 is produced by simultaneously drilling with a laser beam the portion 31, the layer 91 and the strip 90, the terminal portions 94 and 95 of which remain exposed and facing each other and constitute the two electrodes of the head.

Figure 5:
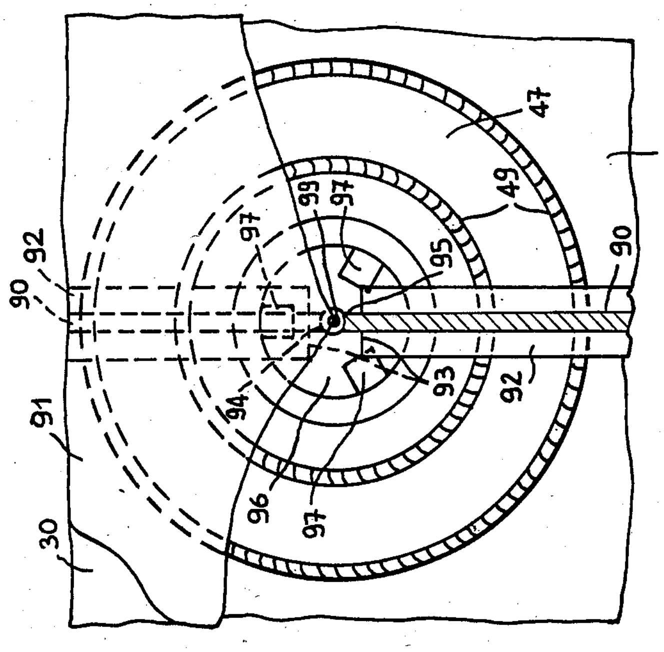
FIG. 5 is a front view of FIG. 4.
Figure 4:
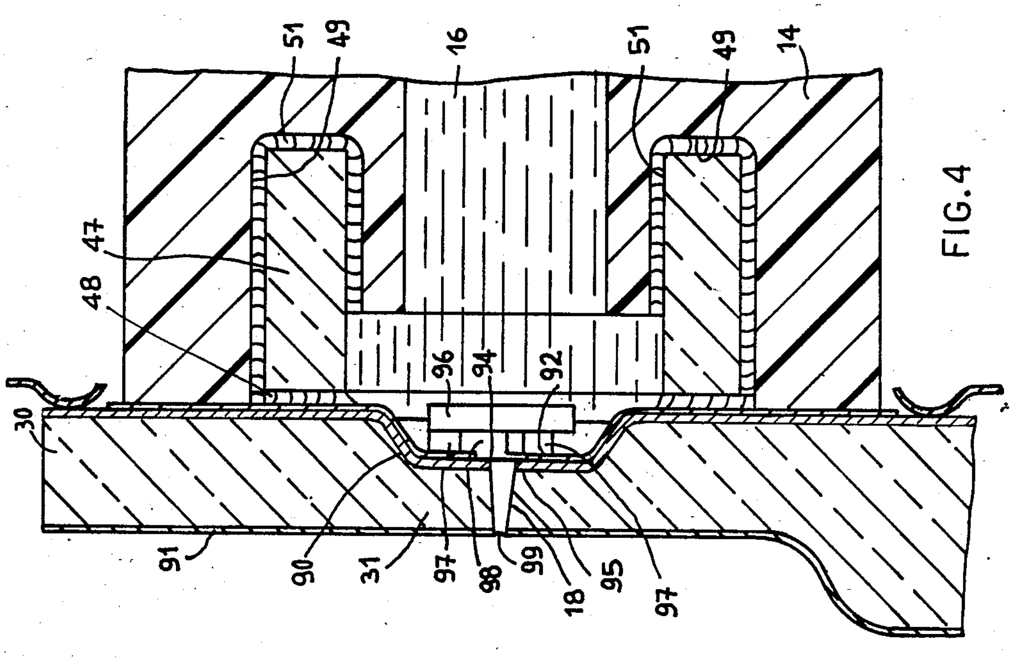
FIG. 4 is a view in section of a portion of an alternative form of the detail shown in FIG. 2.

When the plate 17 has been formed in this way, a plastics plate 96 (see FIG. 4) is fixed thereto, the thickness of the plastics plate 96 being of the order of 0.5 mm and the diameter thereof being a few millimeters, the plastics plate carrying a plurality of spacer members 97, for example three spacer members disposed at 120° as shown in FIG. 5. The spacer members 97 (see FIG. 4) are such as to form between the plate 96 and the portion 31 a gap 98 which is of a thickness of between 0.1 and 1 mm so as to permit the ink to flow towards the nozzle 18. The collar 47 is now fixed to the plate 17 when prepared in the above-described manner, whereby it is fixed to the container 14, as shown in FIG. 2. In this embodiment, the whole nozzle 18 constitutes the front duct containing the ink which submerges the electrode 94 and 95. FIG. 4 illustrates a nozzle which flares inwardly.

When the electrodes 94 and 95 are energized, a current is now produced in the ink, which is disposed at the mouth of the nozzle 18, causing vaporization to cause at least part of the ink contained in the nozzle 18 to be expelled therefrom.

The pressure wave produced by the vaporization effect is reflected by the plate 96, enhancing the ink drop expulsion action. When the vaporization action of the pulse is terminated, the ink rapidly restores the meniscus 99 in the nozzle 18.

In accordance with another alternative form of the invention, the portion 31 of the base 30 (see FIG. 6) is covered with the strip 37, as in the construction shown in FIG. 2. A first dielectric layer 58 of glass-ceramic material, similar to the layer 43 in FIG. 2, is then applied, but leaving a hole 60 which is concentric with the position that the nozzle 18 will occupy, the hole 60 being of a diameter of between 0.5 and 2 mm. The drilling operation is now effected by means of a laser in the portion 31 of the base portion 30 and the strip 37. The layer 58 is then covered with a glass bonding layer 61 for connection to a further front layer of ceramic, as indicated at 62, which is between 0.2 and 0.5 mm in thickness. The layer 62 and the layer 63 have a hole 64 which is concentric with respect to the hole 60 and which is of a diameter of between 50 and 150μ, preferably 100μ, which constitutes the front duct. The hole 64 may be produced by a laser beam or by photo-etching, before bonding the layer 62 to the layer 61. In this case also, energization of the electrodes 40 and 42 causes vaporization of the ink at the outlet of the nozzle 18 whereby the portion of ink contained in the front duct 64 is expelled while the ink contained in the hole 60 is temporarily compressed. When the action of the bubble is terminated, the ink in the hole 60 rapidly restores the meniscus 52 at the outside edge of the duct 64. Therefore, the hole 60 in the layer 58 forms a mini-reservoir of ink which permits a substantial increase in the maximum frequency of dot printing.

Figure 6:
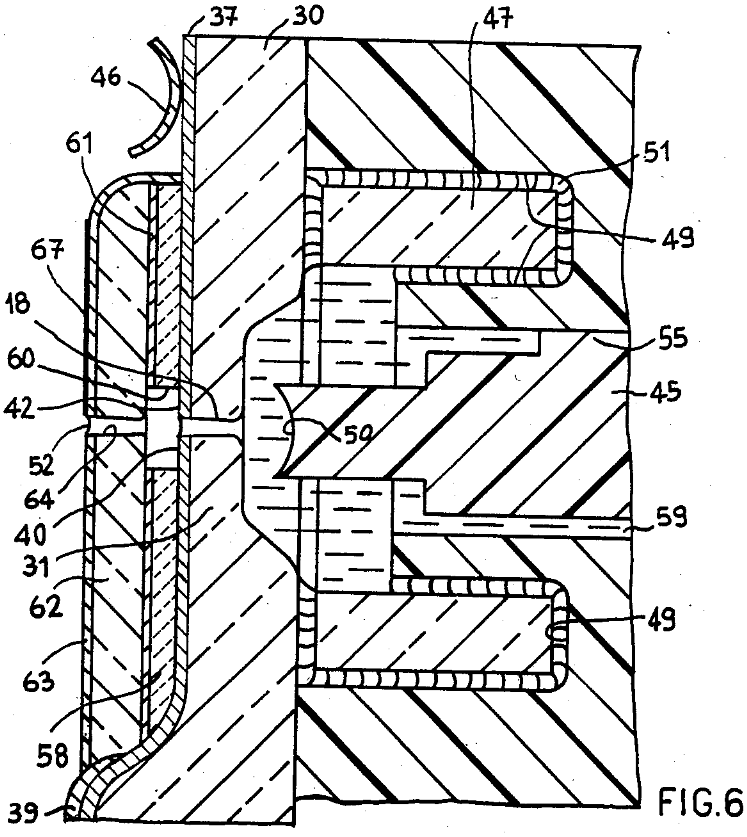
FIG. 6 is a view in section of another alternative formof the detail shown in FIG. 2.
Figure 7:
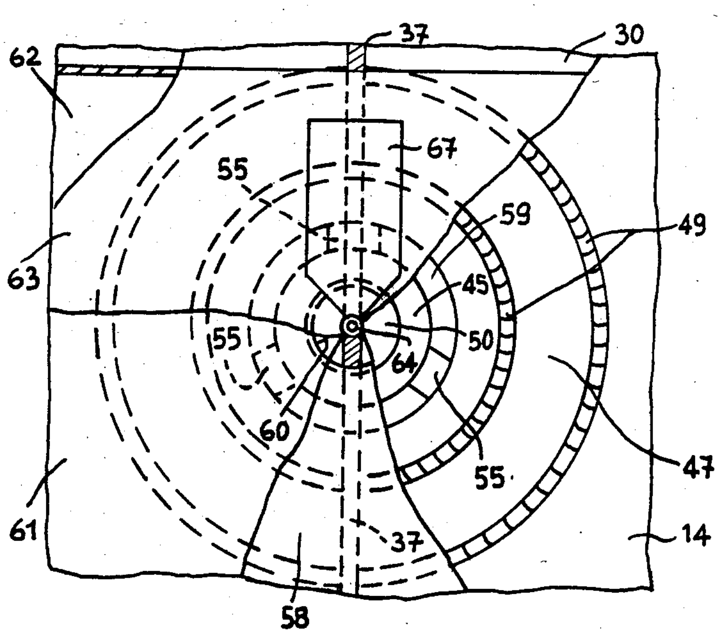
FIG. 7 is a front view of part of FIG. 6.

For the purposes of reflecting towards the nozzle 18 the pressure wave caused by vaporization of the ink, which is directed towards the interior of the container 14, the container is provided with an internal block 45 which terminates with a concave surface 50, preferably of a part-spherical configuration, being disposed in front of the nozzle 18 at a spacing of between 0.1 and 1 mm. The member 50 is connected to the internal wall of the container 14 by means of a plurality of webs 55, for example three webs disposed at 120°, of which only one is shown in FIG. 6. The projections 55 therefore leave a gap 59 which permits the region of the nozzle 18 to be supplied with ink.

An auxiliary electrode 67 may also be disposed on the glass layer 63 of the plate 17, which electrode 67 can be energized at a voltage which is higher than the voltage of the pulses in order to eliminate any encrustation of dry ink after a long period of non-operation. Obviously, the auxiliary electrode 67 (see FIG. 4) may also be disposed on the layer 44 in FIG. 2 and on the layer 91 in FIG. 4, for the same purposes of removing encrusted ink.

Figure 8:
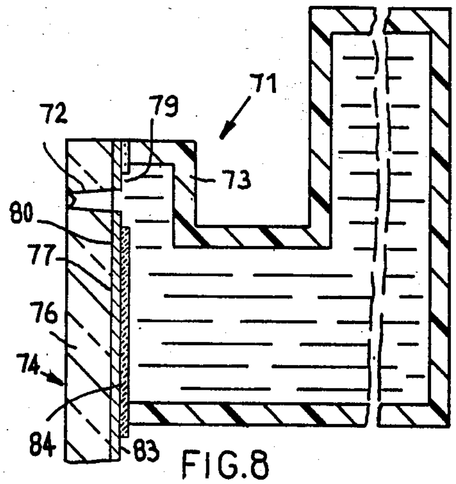
FIG. 8 is a view in longitudinal section of a multi-nozzle head according to the invention.

In accordance with another embodiment of the invention, the print head 70 (see FIGS. 8 and 9) comprises a single container 71 of ceramic material or other insulating material and a reduced depth portion 73, at a reduced spacing from the edge of the container 71. The latter is closed by a plate 74 which carries a series of pairs of electrodes and a series of nozzles 72. In particular, the plate 74 comprises a base portion 76 of ceramic material, which is between 0.3 and 0.6 mm in thickness, to which there is applied a metal layer 77 which is resistant to corrosion, being between 10 and 15$\mu$ in thickness.

The layer 77 is formed by photo-etching so as to form a plurality of strips 78 (see FIG. 9) which are substantially smaller in width than the diameter of the nozzles 72, being connected together by means of a transverse portion 81 of the layer 77, which has an end 82 that can be connected to a pole of the control circuit. The strips 78 extend over the base 76 with a portion 83 which projects from the container 71 to permit electrical connection to a series of individual poles of the control circuit, which can be energized selectively.

Figure 9:
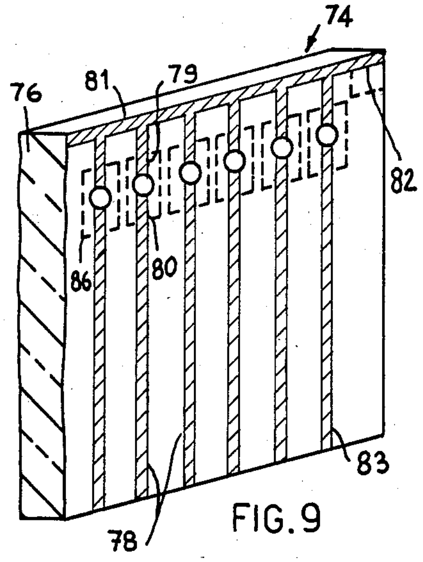
FIG. 9 is a perspective view of part of the head shown in FIG. 1.

The plate 74 is then covered, over the strips 78, with a protective glass layer 84 which, for each position envisaged for the nozzles 72, leaves exposed an area 86 defined by broken lines in FIG. 9. Also left free is the end 82 and the ends of the electrodes 78 on the portion 83. When the plate 74 is prepared in that way, the nozzles 72 are then drilled by means of a laser beam, by drilling simultaneously both the base 76 and the strips 78. The ends 79 and 80 of the latter, which face each other across the respective nozzles 72, constitute the associated pairs of electrodes. The plate 73 is finally bonded by glass bonding to the container 71 and filled with ink. In this embodiment also, the nozzles 72 constitute the front duct containing the volume of ink which is to be expelled in the form of droplets.

In this embodiment also, the flow of current between the electrodes 79 and 80 of a pair thereof produces vaporization at the mouth of the corresponding nozzle 72, which causes a drop of ink to be expelled towards the paper. It will be appreciated that the operation of expelling ink may be effected simultaneously in any number of nozzles 72.

Among possible modifications, the boss 38 may be made of glass-ceramic material, like the layer 37, rather than being sintered together with the base protion 30. The collar 47 may in turn be produced by sintering together with the base portion 30, rather than subsequently welded thereto. In addition, the block 45 in the embodiment shown in FIg. 6 may be replaced by the plate 96 in FIG. 4 and such features may also be provided in the embodiment shown in FIGS. 2 and 3 and in the embodiment shown in FIGS. 8 and 9.

We claim:

1. An ink jet print head comprising a container (14), for a conductive ink (16), provided with a capillary nozzle (18), a pair of electrodes (40, 42) disposed in the nozzle and facing each other across the nozzle, the ink forming a meniscus (52) in the nozzle at a position such as to create a predetermined depth of ink between the electrodes and the meniscus, and wherein at least part of this depth of ink is expelled by selectively energizing the electrodes with voltage pulses such as to cause vaporization of a portion of ink by the effect of the current through the ink in the section of the nozzle between the electrodes, said container being closed by an insulating plate (30) on which there is disposed a metal strip (37) of a thickness of less than 50$\mu$ and of a width which is less than the diameter of the nozzle, the nozzle (18) comprising a hole passing through the plate and the metal strip which thus forms the two electrodes (40, 42), characterized in that a ceramic collar (47) is bonded to the inward side of the plate (30) and is substantially concentric with the nozzle (18), said collar being also bonded into a complementary seat (49) of said container (14).

2. A head according to claim 2, wherein said plate is provided at its front with a projection for bearing a fixed bar to define the spacing of the nozzle from the print carrier, the projection is covered by the metal strip; whereby it bears against the fixed bar which is connected to one of the poles of a circuit for control of the head.

3. A head according to claim 1, characterised in that the metal strip (90) is on the inner surface of the plate (30, 31) and the meniscus (99) forms at the end of the nozzle (18) in the outer surface of the plate.

4. A head according to claim 3, characterised in that the strip (90) is covered by a protective strip (92) which leaves exposed only a region of the metal strip adjacent the nozzle (18).

5. A head according to claim 1, characterised in that the metal strip (37) is on the outer surface of the plate (30, 31) and is sandwiched between this plate and a dielectric layer (43; 58, 62) through which extends a duct (53; 64) forming a front part of the nozzle (18), the meniscus (52) forming at the end of the nozzle in the outer surface of the dielectric layer.

6. A head according to claim 5, characterised in that the strip is 10 to 15$\mu$ thick, the plate (31) is 0.2 to 0.6 mm thick around the nozzle and the dielectric layer is 50 to 100$\mu$ thick.

7. A head according to claim 5, characterised in that the outer surface of the plate (30, 31) or the dielectric layer (43; 58, 62) is coated with a layer (44; 91; 63) of glass less than 20$\mu$ thick to prevent ink adhering to the outer surface.

8. A head according to claim 5, characterised in that the dielectric layer comprises a first, inner layer (58) and a second, outer layer (60) through which extends the duct (64).

9. A head according to claim 8, characterised in that the second layer (62) is 0.1 to 0.2 mm thick and the duct (64) therein is between 50 and 150$\mu$ in diameter.

10. An ink jet print head comprising a container for a conductive ink closed by an insulating plate provided with a capillary nozzle, a pair of electrodes disposed in the nozzle and facing each other across the nozzle, the ink forming a meniscus in the nozzle at a position such as to create a predetermined depth of ink between the electrodes and the meniscus, at least part of this depth of ink being expelled by selectively energizing the electrodes with voltage pulses such as to cause vaporization of a portion of ink by the effect of the current through the ink in the section of the nozzle between the electrodes, said electrodes each being formed of a metal strip of a thickness of less than 50μ, and of a width less than the diameter of the nozzle, said metal strip being sandwiched between the outer surface of said plate and a dielectric layer, the nozzle being formed of a hole passing through said plate, said metal strip and said dielectric layer, the meniscus forming at the end of the nozzle in the outer surface of said dielectric layer, characterized in that the dielectric layer comprises a first inner layer and a second outer layer through which extends said nozzle, and in that the first layer has a hole which is coaxial with the nozzle and which is of a diameter at least 15 times that of the nozzle, thereby forming a reservoir between the plate and the second layer for rapidly reforming the meniscus after each emission.

11. An ink jet print heat comprising a container for a conductive ink, closed by an insulating plate provided with a series of parallel capillary nozzles, a pair of electrodes disposed in each nozzle and facing each other across the nozzle, the ink forming a meniscus in each nozzle at a position such as to create a predetermined depth of ink between each pair of electrodes and the meniscus, and wherein at least part of this depth of ink is expelled by selectively energizing the electrodes with voltage pulses such as to cause vaporization of a portion of ink by the effect of the current through the ink in the section of the nozzle between the pair of electrodes, the insulating plate being formed of ceramic material through which the nozzles are formed, and comprising a plurality of photo-etched metal strips on the inner surface of the plate, the width of the strips being less than the diameter of the nozzles, whereby the strips are divided by the nozzles into pairs of electrodes associated with the nozzles, and an internal wall having a surface spaced between 0.1 and 1 mm from the inner end of the nozzles and capable of reflecting toward the nozzles the pressure wave which is caused by the vaporization effect.

12. A head according to claim 11, characterised in that the plate (76) is covered over the metal strips (78) with a protective glass layer (84), with the exception of a plurality of areas (86) containing the mutually facing ends of the electrodes (79, 80).

13. A head according to claim 11, characterised in that first electrode (79) of the pairs are connected in a comb-like configuration by means of a transverse portion of metal strip (81) connected to one pole of a control circuit (21), the plate (76) comprising a portion over which the other electrodes of the pair extend, this portion projecting from the container, whereby the other electrodes are connected to other individual poles of the control circuit.

14. An ink jet print head comprising a container for a conductive ink, provided with a capillary nozzle, a pair of electrodes disposed in the nozzle and facing each other across the nozzle, the ink forming a meniscus in the nozzle at a position such as to create a predetermined depth of ink between the electrodes and the meniscus, and wherein at least part of this depth of ink is expelled by selectively energizing the electrodes with voltage pulses such as to cause vaporization of a portion of ink by the effect of the current through the ink in the section of the nozzle between the electrodes, wherein the container is closed by an insulating plate on which there is disposed a metal strip of a thickness of less than 50μ and of a width which is less than the diameter of the nozzle, the nozzle comprising a hole passing through the plate and the metal strip which thus forms the two electrodes, characterized in that an auxiliary electrode is disposed on the outside surface thereof, the auxiliary electrode being capable of being energized by a voltage which is higher than the voltage of the said pulses to remove encrustations of dry ink.

15. An ink jet print heat comprising a container for a conductive ink, provided with a capillary nozzle, a pair of electrodes disposed in the nozzle and facing each other across the nozzle, the ink forming a meniscus in the nozzle at a position such as to create a predetermined depth of ink between the electrodes and the meniscus, and wherein at least part of this depth of ink is expelled by selectively energizing the electrodes with voltage pulses such as to cause vaporization of a portion of ink by the effect of the current through the ink in the section of the nozzle between the electrodes wherein the improvement includes an insulating plate closing said container and provided with a metal strip of a thickness of less than 50μ and of a width which is less than the diameter of the nozzle, the nozzle comprising a hole passing through the plate and the metal strip which thus forms the two electrodes, and an internal body having a surface spaced between 0.1 and 1 mm from the inner end of the nozzle and which is capable of reflecting towards the nozzle the pressure wave which is caused by the vaporization effect.

16. A head according to claim 15, wherein a ceramic collar is bonded to the inward side of said plate and is substantially concentric with said nozzle, said ceramic collar being bonded into a complementary seat in the container, said internal body being also concentric with said collar.

17. A head according to claim 15, wherein said surface of the internal body is concave and is capable of concentrating the reflected pressure wave towards the mouth of the nozzle.

* * * * *